UNITED STATES PATENT OFFICE.

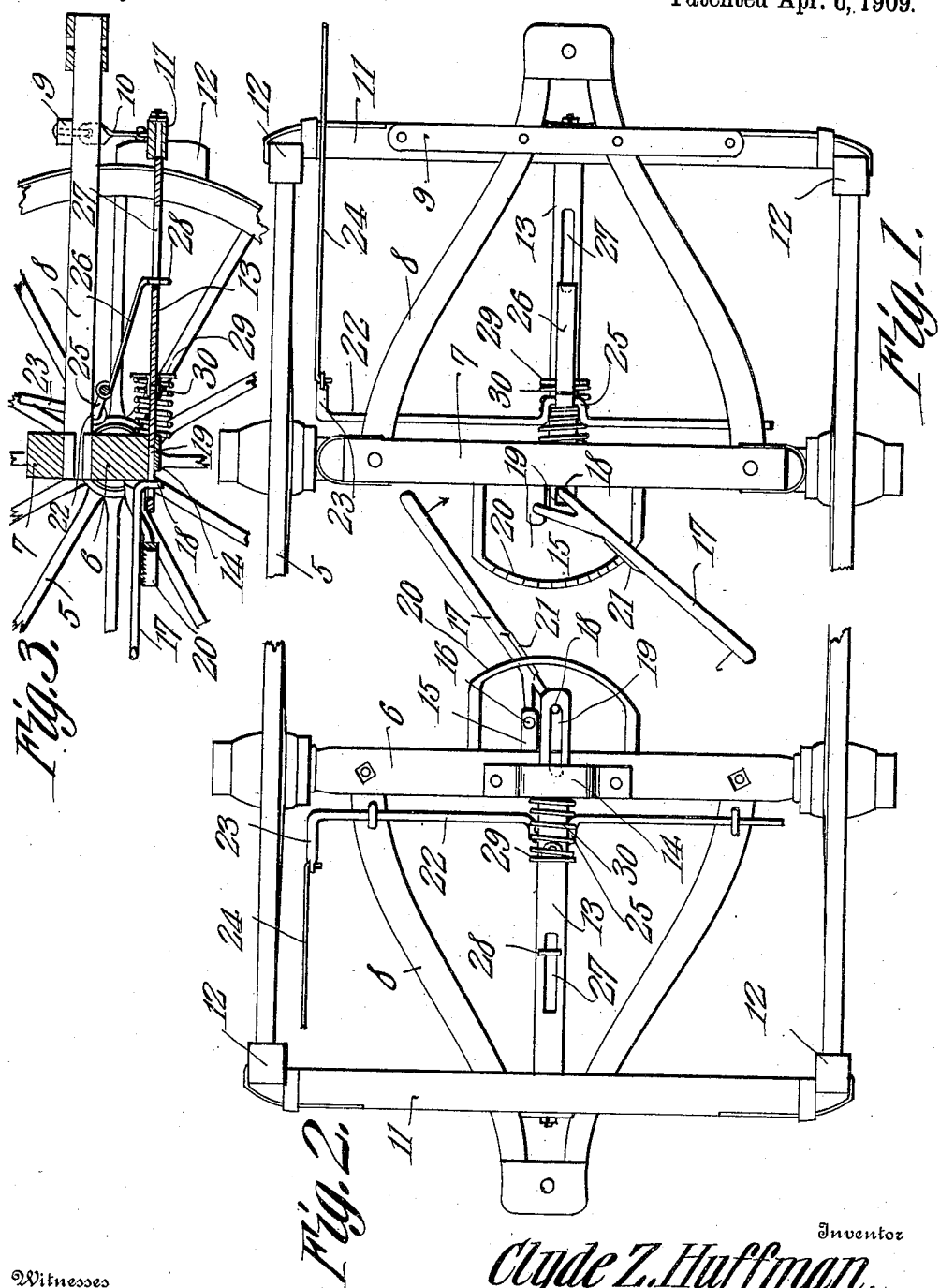

CLYDE Z. HUFFMAN, OF LURAY, VIRGINIA.

VEHICLE-BRAKE.

No. 917,072.　　　Specification of Letters Patent.　　Patented April 6, 1909.

Application filed November 20, 1908. Serial No. 463,655.

*To all whom it may concern:*

Be it known that I, CLYDE Z. HUFFMAN, a citizen of the United States, residing at Luray, in the county of Page and State of Virginia, have invented a new and useful Vehicle-Brake, of which the following is a specification.

This invention relates more particularly to the mechanism for operating a vehicle brake, the object of the invention being to provide improved means for operating the brake from the driver's seat, and also from the rear end of the vehicle.

The invention also has for its object to provide a brake-operating mechanism of this kind which is simple in structure and reliable in operation, and to this end it consists in the novel combination and arrangement of parts, to be hereinafter described and claimed, reference being had to the drawings hereto annexed, in which:—

Figure 1 is a top plan view of the rear end of a wagon, showing the application of the invention. Fig. 2 is a bottom plan view. Fig. 3 is a central longitudinal section.

I have shown in the drawings only so much of a wagon as will suffice to show the connection of the invention therewith, and, in the drawings, 5 denotes the hind wheels of a wagon, and 6 the axle thereof. The bolster is indicated at 7, and the hounds at 8. On the hounds is mounted a cross bar 9, from which is suspended, by means of links 10, the brake-beam 11, fitted with the usual brake shoes 12. To the brake-beam 11 is rigidly secured a rearwardly extending bar 13, which works adjacent to its outer end, on a bracket 14, secured to the bottom of the axle 6. On said axle is a bracket 15, to which is pivoted, at 16, an angle lever 17, having a downturned end 18, which extends into a slot 19 in the bar 13. By reason of this connection between the lever and the bar 13, it will be seen that the latter is moved rearwardly when the lever is swung in the direction of the arrows, shown in Figs. 1 and 2 of the drawings, and by reason of the connection of the bar 13 with the brake-beam 11, the brake will be applied. The hand lever 17 is located at the rear end of the wagon, so that a person walking behind the same can apply the brake. On the axle 6 is mounted a notched segment 20, engageable by a tongue 21, on the lever 17, for holding the same in adjusted position.

The mechanism for operating the brake from the driver's seat comprises the following instrumentalities:—On the bottom of the hounds 8 is journaled a rock-shaft 22 having, at one of its ends, a lateral bend 23, which is connected by a rod 24, to a lever mounted adjacent to the driver's seat. The rock-shaft has a crank portion 25, which is connected by a link 26 with the bar 13. The connection between the link and the bar is a loose one, the latter being provided with a longitudinal slot 27, into which a reduced portion at the end of the link extends. The end of the link is formed with the head or enlargement 28 engaging the under side of the bar 13, whereby said link is prevented from being disconnected from said bar 13. Around the bar 13, between the front end of the axle 6 and the front edge of the bracket 14, and an abutment 29 secured to said bar, is coiled a spring 30, which normally holds the bar 13 in a position to release the brake. When the brake is applied the spring is compressed, and, upon releasing the hand lever 17 or the hand lever at the driver's seat, the spring expands and pushes the bar 13 in a position to release the brake. By providing the bar 13 with the slots 19 and 27, it will be seen that either operating mechanism of the brake may be actuated to apply the brake, without affecting the other. When the brake is applied from the driver's seat, the rock-shaft 22 is swung in the direction to move the link 26 rearwardly, and, upon the latter engaging with the rear end of the slot 27, the bar 13 will be moved rearwardly, and the brake thus applied.

The brake may be applied by the hand lever 17 by swinging the same on its pivot 16, the downturned end 18 engaging the rear end of the slot 19, whereby the bar 13 is also moved rearwardly, to apply the brake.

It will be seen, from the foregoing, that I have provided a brake operating mechanism which is simple in construction and which can be easily operated, and, as it has no complicated parts to get out of order, it will be reliable in action.

What is claimed is:—

1. In a brake operating mechanism, the combination with the hind axle of a wagon, and a brake beam; of a bracket mounted on the under side of the axle, a bar connected to the brake beam and slidably supported on the bracket, said bar being provided with a pair of longitudinally extending slots, a rock-shaft having a crank portion, a link connected to said crank portion and extending into one of the aforesaid slots of the bar, means for operating the rock-shaft, a lever pivoted to the axle and having a branch extending into the other slot of the bar, an abutment on the bar, and a spring coiled around the bar between said abutment and the axle.

2. In a brake operating mechanism, the combination with the hind axle of a wagon, and the hounds; of a cross-bar supported on the hounds, a brake beam suspended from the cross-bar, a bracket mounted on the under side of the axle, a bar connected to the brake beam and slidably supported on the bracket, said bar being provided with a pair of longitudinally extending slots, a rock-shaft having a crank portion, a link connected to said crank portion and extending into one of the aforesaid slots of the bar, means for operating the rock-shaft, and a lever engageable with the other slot of the bar.

In testimony that I claim the foregoing as my own, I have hereto affixed my signature in the presence of two witnesses.

CLYDE Z. HUFFMAN.

Witnesses:
R. S. PARKS,
N. T. SEDWICK.